United States Patent
Hughes et al.

(10) Patent No.: US 7,061,883 B2
(45) Date of Patent: *Jun. 13, 2006

(54) COMMUNICATIONS SYSTEM AND METHOD

(75) Inventors: Philip T. Hughes, Longstanton (GB); Timothy Jackson, Stapleford (GB); James Newman, Cottenham (GB)

(73) Assignee: Radiant Networks PLC, Essex (GB)

( * ) Notice: Subject to any disclaimer, the term of this patent is extended or adjusted under 35 U.S.C. 154(b) by 874 days.

This patent is subject to a terminal disclaimer.

(21) Appl. No.: 09/925,643

(22) Filed: Aug. 10, 2001

(65) Prior Publication Data

US 2002/0012336 A1    Jan. 31, 2002

Related U.S. Application Data

(62) Division of application No. 09/331,219, filed as application No. PCT/GB97/03472 on Dec. 18, 1997, now Pat. No. 6,553,020.

(30) Foreign Application Priority Data

Dec. 18, 1996  (GB) .................................... 9626210
Sep. 22, 1997  (GB) .................................... 9720152

(51) Int. Cl.
 *H04Q 7/00*   (2006.01)
(52) U.S. Cl. ....................... 370/328; 370/347; 370/336; 370/345; 455/445; 455/524
(58) Field of Classification Search ................ 370/328, 370/336–337, 345, 347, 442; 455/77, 422.1, 455/445, 517, 524–525, 562.1
See application file for complete search history.

(56) References Cited

U.S. PATENT DOCUMENTS 4,090,067 A    5/1978  Bell, III et al.

(Continued)

FOREIGN PATENT DOCUMENTS

DE          4224 422 A1     1/1994

(Continued)

OTHER PUBLICATIONS

U.S. Appl. No. 09/331,219, filed Jun. 17, 1999, Hughes et al.

(Continued)

*Primary Examiner*—Chi Pham
*Assistant Examiner*—Rhonda Murphy
(74) *Attorney, Agent, or Firm*—Pillsbury Winthrop Shaw Pittman LLP

(57) ABSTRACT

A communications system (1) includes a plurality of nodes (2). Each node (2) has receiving means for receiving via an antenna (13) a signal transmitted by wireless transmitting means; transmitting means for wireless transmission of a signal via an antenna (13); and, means for determining if a signal received by said node (2) includes information for another node (2) and causing a signal including said information to be transmitted by said transmitting means to another node (2) if said received signal includes information for another node (2). Each node (2) has one or more substantially unidirectional point-to-point wireless transmission links (3). At least some of the nodes (2) have plural substantially unidirectional point-to-point wireless transmission links (3) which share at least one of a receiver (10) of the receiving means and a transmitter (11) of the transmitting means. Each of the links (3) is to one other node (2) only. At least some of the nodes (2) are the origination and termination point of user traffic.

40 Claims, 12 Drawing Sheets

U.S. PATENT DOCUMENTS

| | | | |
|---|---|---|---|
| 4,308,613 A | 12/1981 | Chasek | |
| 5,212,807 A | 5/1993 | Chan | |
| 5,313,461 A | 5/1994 | Ahl et al. | |
| 5,448,753 A | 9/1995 | Ahl et al. | |
| 5,463,671 A | 10/1995 | Marsh et al. | |
| 5,473,602 A * | 12/1995 | McKenna et al. | 370/256 |
| 5,559,795 A | 9/1996 | Ahl | |
| 5,600,652 A | 2/1997 | Kreamer et al. | |
| 5,652,751 A * | 7/1997 | Sharony | 370/227 |
| 5,926,101 A * | 7/1999 | Dasgupta | 340/825.02 |
| 6,169,910 B1 | 1/2001 | Tamil et al. | |

FOREIGN PATENT DOCUMENTS

| | | |
|---|---|---|
| EP | 0 563 572 A2 | 10/1993 |
| EP | 0 685 950 A2 | 12/1995 |
| EP | 0 725 523 A2 | 8/1996 |
| EP | 0 450 382 B1 | 5/1997 |
| EP | 0 999 717 A2 | 5/2000 |
| WO | WO 90/03071 | 3/1990 |
| WO | WO 93/07691 | 5/1993 |
| WO | WO 93/15565 | 8/1993 |
| WO | WO 95/04420 | 2/1995 |
| WO | WO 95/23471 | 8/1995 |
| WO | WO 95/34143 | 12/1995 |
| WO | WO 95/35612 | 12/1995 |
| WO | WO 96/00468 | 1/1996 |
| WO | WO 96/01029 | 1/1996 |
| WO | WO 98/01922 | 1/1998 |
| WO | WO 00/25485 | 5/2000 |

OTHER PUBLICATIONS

U.S. Appl. No. 09/925,642, filed Aug. 10, 2001, Hughes et al.

U.S. Appl. No. 09/925,644, filed Aug. 10, 2001, Hughes et al.

U.S. Appl. No. 09/925,645, filed Aug. 10, 2001, Hughes et al.

Sunlin, R., "A Hybrid Distributed Slot Assignment TDMA Channel Access Protocol," 1990 IEEE Military Communications Conference; Monterey, CA; vol. 3; Sept. 30-Oct. 3; pp. 934-938.

Dobosiewicz et al., "A bounded-hip-count deflection scheme for Manhattan-street networks," Proceedings of IEEE infocom 1996; Mar. 24-28, 1996; vol.1, pp. 172-179.

Altshuler, "A Monopole Loaded With a Loop Antenna," IEEE Transactions on Antennas and Propagation; vol. 44, No. 6, Jun. 1996; pp. 787-791.

Eng et al., "Bahama: A Broadband Ad-Hoc Wireless ATM Local-Area Netword," Communications — Gateway to Globalization Proceedings of the Conference on Communications Seattle; IEEE Jun. 1995; vol. 2, pp. 1216-1223.

Gitlin et al., "Lucky Net " An Overview, Proceedings of the IEEE Conference on Global Communications (GLOBECOM), vol.2, Dec. 1991, pp. 1055-1064.

* cited by examiner

|    | A0 | A1 | A2 | A3 | A4 | A5 | A6 | A7 |
|----|----|----|----|----|----|----|----|----|
| T0 | 1  | -  | -  | -  | -  | -  | -  | -  |
| T1 | -  | 1  | -  | -  | -  | -  | -  | -  |
| T2 | -  | -  | 1  | -  | -  | -  | -  | -  |
| T3 | -  | -  | -  | 1  | -  | -  | -  | -  |
| T4 | -  | -  | -  | -  | 1  | -  | -  | -  |
| T5 | -  | -  | -  | -  | -  | 1  | -  | -  |
| T6 | -  | -  | -  | -  | -  | -  | 1  | -  |
| T7 | -  | -  | -  | -  | -  | -  | -  | 1  |

|    | A0 | A1 | A2 | A3 | A4 | A5 | A6 | A7 |
|----|----|----|----|----|----|----|----|----|
| T0 | 1  | -  | -  | -  | -  | -  | -  | -  |
| T1 | 1  | -  | -  | -  | -  | -  | -  | -  |
| T2 | -  | 1  | -  | -  | -  | -  | -  | -  |
| T3 | -  | -  | 1  | -  | -  | -  | -  | -  |
| T4 | -  | -  | -  | -  | 1  | -  | -  | -  |
| T5 | -  | -  | -  | -  | 1  | -  | -  | -  |
| T6 | -  | -  | -  | -  | 1  | -  | -  | -  |
| T7 | -  | -  | -  | -  | -  | -  | -  | 1  |

|    | A0 | A1 | A2 | A3 | A4 | A5 | A6 | A7 |
|----|----|----|----|----|----|----|----|----|
| T0 | -  | -  | -  | -  | 1  | -  | -  | -  |
| T1 | -  | -  | -  | -  | 1  | -  | -  | -  |
| T2 | -  | -  | -  | -  | 1  | -  | -  | -  |
| T3 | -  | -  | -  | -  | 1  | -  | -  | -  |
| T4 | -  | -  | -  | -  | 1  | -  | -  | -  |
| T5 | -  | -  | -  | -  | 1  | -  | -  | -  |
| T6 | -  | -  | -  | -  | 1  | -  | -  | -  |
| T7 | -  | -  | -  | -  | 1  | -  | -  | -  |

```
Begin RoutePacket ()

Define L of type Address;
Define next_channel, input_channel of type Channel;
Define msg of type Message;
Import messageQueue of type Queue;

forever
        if length of (messageQueue) > O then
                dequeueMessage (messageQueue, (msg, input_channel));

if msg.status = Returned then
                        -- this message has been returned.
                        handleReturnedMessage (msg, input_channel);
                else
                        -- Pass message on to next node.
                        set L := msg.L if L = my_L then
                        -- Packet has arrived - terminates here.
                                ProcessCell (msg.cell);
                        else
                                set next_channel := decideNextChannel (L,my_L);

if next_channel = NoBestChannel then
                                        set msg.status := Returned;
                                        set next_channel := input_channel;
                                end if
                                SendPacketToChannel (msg, next_channel);
                        end if
                end if
        end if
end end RoutePacket.
```

Figure 16

Begin decideNextChannel (Address L, Address my_L) of type Channel define hop of type Address;
   define weightedChannelSum, sum, weightedChannel of type Real Number;
   define bestChannel of type Channel;
   define j, unuseableChannels of type Integer;

set hop := L - my_L;
   set weightedChannelSum := 0.0;
   set sum := 0.0;

for j := 0 to Length of(hop)
   {
      if ChannelUtilisation (j) > MaximumChannelUtilisation then
         set unuseableChannels := unuseableChannels + 1;
      end if
      set weightedChannelSum:= weightedChannelSum+hop[j]*j/ChannelUtilisation (j);
      set sum := sum - hop [j] / ChannelUtilisation [j];
   } if unuseableChannels = ActiveChannels then
   -- message cannot be forwarded from this node must be handed back to sender.
      return NoBestChannel;
   end if
   set weightedChannel := weightedChannelSum / sum;
   set bestChannel := MapWeightedChannelToBestChannel (weightedChannel);

return bestChannel;
end decideNextChannel

Figure 17

COMMUNICATIONS SYSTEM AND METHOD

This is a Division of U.S. application Ser. No. 09/331,219 filed on Jun. 17, 1999, now U.S. Pat. No. 6,553,020, which is a U.S. national phase of PCT/GB97/03472 filed on Dec. 18, 1997, the entirety of which is hereby incorporated herein by reference.

The present invention relates to a communications system and method.

There is an increasing demand for high bandwidth communications systems which can carry data at rates which are significantly higher than those which are presently available to business or residential users. Systems which would benefit from very high data transfer rates include video-on-demand, video conferencing and video "telephony", business and home Internet access, local area networks (LAN) interconnects, virtual private networks, teleworking, on-line games, high definition television, and many other applications demanding high information transfer rates.

In a conventional telephone communications system, the system operator's main switched trunk network is connected to an access network which connects the trunk network to a subscriber's individual telephone handset or private branch exchange (PBX). The access network is often known as the "local loop".

The vast majority of local loop networks in the United Kingdom and many other countries are based on wires which are either buried in the ground or are suspended overhead from poles. The wire extends from the regional access switch to the subscriber and is essentially dedicated to one subscriber and carries signals for no-one else.

Copper wire has conventionally been used primarily because of its relative low cost. However, copper wire can only carry data at a rate of about 2,400 to 9,600 bits per second (bps) without data compression. With more sophisticated techniques, this limit has been increased to about 57,000 bps. However, this is extremely slow when compared with the rate required for real-time video, which is in the region of 2 to 9 million bps (Mbps).

Some UK operators are now offering digital access services using the integrated services digital network (ISDN) system. However, the data transfer rate is still only about 64,000 to 128,000 bps with ISDN or ISDN2 and wired technology is still used. More recently, wired systems such as HDSL (high speed digital subscriber line) and ADSL (asymmetric digital subscriber line) can deliver up to 2,000,000 bps (2 Mbps). However, as these are still wired systems, there is a very substantial start-up cost for any such system in that the operator must incur the significant cost of digging up roads, pavements, etc. to lay the cables or wires to a large number of subscribers before the system can begin operating. Indeed, the operator must take a large financial risk when setting up a new wired system in that the operator must lay a very large number of cables or wires before potential customers have committed themselves to the system so that the operator can offer a system which is already functional. This is obviously a significant risk, particularly where new technology is involved and the level of customer take-up of the system is unknown at the time the operator installs the infrastructure for the system.

Similarly, in a conventional, point-to-multipoint (broadcast) cellular system, each subscriber unit deals only with information intended for that subscriber.

Both the standard telephone system and cellular system mentioned above require some form of central station sending information to and receiving information from outlying or peripheral subscriber stations.

A wireless system is very much cheaper to install as no mechanical digging or laying of cables or wires is required. User sites can be installed and de-installed very quickly. Thus, radio communications systems have many attractive features in the area of large-scale system deployment. However, it is a feature of radio systems when a large bandwidth (data transfer rate) is required that, as the bandwidth which can be given to each user increases, it is necessary for the bandwidth of the radio signals to be similarly increased. Furthermore, the frequencies which can be used for radio transmission are closely regulated and it is a fact that only at microwave frequencies (i.e. in the gigahertz (GHz) region) or higher are such large bandwidths now available as the lower radio frequencies have already been allocated.

The problem with microwave or higher frequencies is that these radio frequencies are increasingly attenuated or completely blocked by obstructions such as buildings, vehicles, trees, etc. Such obstructions do not significantly attenuate signals in the megahertz (MHz) band but becomes a serious problem in the gigahertz (GHz) band. Thus, conventional wisdom has been that microwave or higher frequencies are difficult to use in a public access network which provides communication with a large number of distributed users.

The spectral efficiency of any wireless communications system is extremely important as there are many demands on radio bandwidth. As a matter of practice, the regulatory and licensing authorities are only able to license relatively narrow regions of the radio spectrum. A cellular system, which uses point-to-multipoint broadcasts, places high demands on the radio spectrum in order to provide users with a satisfactory bandwidth and is therefore not very efficient spectrally.

The use of repeaters or relays to pass on data from one station to another is well known in many applications. However, in each case, such repeaters broadcast signals, in a point-to-multipoint manner, and are therefore similar to a cellular approach and suffer from a corresponding lack of spectral efficiency.

According to a first aspect of the present invention, there is provided a communications system, the system comprises a plurality of nodes. Each node has receiving means for receiving via an antenna a signal transmitted by wireless transmitting means; transmitting means for wireless transmission of a signal via an antenna; and, means for determining if a signal received by said node includes information for another node and causing a signal including said information to be transmitted by said transmitting means to another node if said received signal includes information for another node. Each node has one or more substantially unidirectional point-to-point wireless transmission links. At least some of the nodes have plural substantially unidirectional point-to-point wireless transmission links which share at least one of a receiver of the receiving means and a transmitter of the transmitting means. Each of said links is to one other node only. At least some of the nodes are the origination and termination point of user traffic.

Wireless transmission is used to provide communication with each node. In practice, each node is likely to be equipment associated with a user of or subscriber to the system. Each node is preferably stationary or fixed. The nodes operate in a peer-to-peer manner, which is in contrast to the central-master/peripheral-slave manner of say a cellular broadcast system. In the present invention, information is typically transferred in a series of "hops" from node to node around the system between a source node and a destination node. In the preferred embodiment, the nodes are logically connected to each other by plural point-to-point links between each linked pair of nodes and can be regarded as providing an interconnected "web" covering a geographical area and providing a non-cellular network. The links are substantially unidirectional, i.e. signals are not broadcast but are instead directed to a particular node with signals being capable of being passed in both directions along the link.

It will be appreciated that some prior art systems have nodes which can communicate with each other with the nodes acting as simple repeaters. However, the individual transmissions in such prior art systems are often omnidirectional or use wide-angled transmission sectors and so such systems are still fundamentally cellular in structure. Such prior art systems thus tend to use point-to-multipoint transmissions, using a master/slave or central/peripheral architecture. In the preferred embodiment of the present invention, the nodes are connected in a peer-to-peer manner, with point-to-point links, in an interconnected mesh. In the present invention, many links across the system or network may be "active", that is carrying signals, at the same time so that plural pairs of linked nodes may be communicating with each other substantially simultaneously. In the preferred embodiment, for each node, only one link is "active" at any one time and the link is active in only one direction at a time (i.e. a node is either transmitting only or receiving only on that link). In other words, if a node is transmitting or receiving on one of its links, it will not be receiving or transmitting on any of its other links. This greatly increases spectral efficiency compared to a cellular system or other systems using broadcast transmissions from a node. This configuration also helps to keep down the cost of the individual nodes as each node only requires one transmitter and one receiver.

Each node of the invention may be autonomous with respect to, for example, the transmission of signals to other nodes and need not be reliant on control signals from some central controller or any other node. "Calls" between nodes can be effectively asynchronous and a call between a pair of nodes can start and finish effectively at any time, substantially independently of the state of any other call.

In an example of the invention, each node is a subscriber unit which can be mounted on or near a subscriber's house. In addition, further nodes may be strategically placed in other suitable places according to the requirements of the operator. Thus, it is not necessary to provide metal (e.g. copper) wire, fibre optic or other fixed "hard" links to each user, which saves the very high costs of digging up roads, laying fixed cables, etc. This means that the entry cost for a provider of the system can be relatively very low. A small system providing access for say a hundred or a thousand users can be set up very cheaply and additional users can be added later as demand grows.

In contrast to conventional point-to-multipoint broadcast radio systems, the present invention does not require a central transmitter with an extremely high bandwidth to service the subscribers' data demands. In fact, except for possible interfacing to a trunk network, no high capital cost, high-profile, high-complexity sites are required for air-side interfacing, switching and transmission. These functions can be delocalised over the whole network in the system described herein. Moreover, the present invention does not require the large and unsightly radio masts/towers which are typical of cellular systems.

Nodes, as well as carrying traffic intended for other nodes, can also be the origination and termination point of users traffic. This has benefits for expansion of the network because, in principle, traffic can be injected and extracted from any node in the network, unlike cellular systems where a high-profile location (such as a hill top) has to be chosen for this purpose for example.

One or more nodes may be associated with plural users of or subscribers to the system. For example, a small business may have one node to which their internal LAN (local area network) is connected whereby all of the LAN users can access the communications system. A node with a bandwidth of say 2 Mbps could support up to 200 users each requiring a bandwidth of 9,600 bps.

Each node is used to pass on or "route" those signals which include information intended for other nodes in the system. If a node should fail in the system of the present invention, there is a loss of service only for the subscriber (if any) associated with that node and information for other nodes can be routed through nodes other than the failed node in the preferred embodiment.

Information is passed as necessary in a series of "hops" from one node to another via a preferably predetermined route until the information reaches its destination node.

The nodes are preferably linked so as to form plural transmission path loops thereby to provide plural choices of path for the transmission of a signal between at least some of the nodes. Each loop preferably consists of an even number of links. This allows for proper synchronisation of transmission and reception between nodes.

For each node that has plural links to other nodes, each of said plural links to another node is preferably associated with a time slot. Each link for each node may be associated with a distinct time slot. Thus, where TDM (time division multiplexing) is used, no node has more than one link having the same time slot number in the TDM frame structure.

The allocation of time slots to the links may be varied such that a link may selectively be associated with more than one time slot. This allows the effective bandwidth supported by a particular link to be increased, perhaps temporarily, as required by a user associated with a particular node for example.

Each node preferably has a direct line-of-sight link with at least one other node such that each node can transmit a signal to another node in line-of-sight with said each node. It will be understood that line-of-sight means that the path between two nodes connected by a line-of-sight link is entirely or substantially unobstructed such that the path is transparent or substantially transparent to the frequency used.

"Information" in a signal may be for example software, whether for the operation of the node itself or for use by a subscriber associated with the node or otherwise, voice telephony data, video data, or telecommunications traffic generally.

Preferably, a signal including said information is transmitted by a node to another node if and only if a signal received at said node includes information for another node.

The number of nodes is preferably less than the number of links. This serves to ensure that there can be several distinct paths between any two nodes. Also, because the traffic equations are under-constrained, the traffic flowing on a link is not only a function of the subscriber injected/removed traffic, but also a function of the traffic on other links. This leads to a large number of possible traffic configurations for any given subscriber traffic. This means that (i) the point-to-point capacity of the network is increased relative to chain and tree topologies, (ii) it allows scope for network management strategies to alter traffic flows in parts of the network to prevent congestion without, in principle, adversely affecting the traffic carrying-capacity of the network as a whole, and (iii) the spectral efficiency of the system can be greatly improved over conventional cellular radio techniques.

Each node is preferably arranged to be in a transmission mode for a time period which alternates with a time period for a reception mode.

Other duplex techniques, such as Frequency Division Duplex (FDD), may be used.

Because each node is concerned with switching as well as the transmission of information traffic, the whole system can effectively behave as a distributed switch. This means that conventional access switches (i.e. exchanges), which represent significant capital expenditure, can be eliminated.

Many topologies for connecting the nodes are possible. Possible topologies include a fully interconnected topology, in which each node is directly connected to each other node; a linear chain topology, in which each node is connected to two other nodes in a chain; a tree topology, in which each node is connected to a predetermined number of other nodes such that there are no loops in the topological structure; a lattice topology, in which each node is connected to up to a predetermined number of nearest neighbours; and, a hypercube-type topology in which each node is linked to n other nodes. Non-regular topologies, with for example a random interconnection of nodes and/or a high degree of interconnectivity, are also possible and have many desirable properties. For example, a non-regular topology (like certain regular topologies) may provide a large number of possible routes for information to pass across the system or web. Combinations of topologies are also possible. For example, a hypercube structure of dimension n could service clusters of n fully interconnected n-valent nodes. A structure close to a perfect hypercube could alternatively be used for example.

It will be appreciated that in most areas where the system is deployed, the location of the nodes is dictated by the subscriber locations and that lines of sight between the nodes depends on the local geography. In such situations, it is unlikely that a prechosen network topology can be mapped onto the available lines of sight. A more pragmatic approach is to build up the network from the available lines of sight, carrying out the process with a view to creating a network with the desired traffic-bearing characteristics. Computer modelling has been carried out and it has been shown that it is possible to fulfil the requirements and preferred features of the network without having a regular form. The modelling indicates that structures worked up from the actual physical connectivity can perform well with regard to traffic-bearing properties.

Preferably, at least one node is arranged not to transmit to any other node information in a signal received by said at least one node when that information is addressed to said at least one node. Most preferably, all nodes operate in this manner.

Each node preferably has addressing means for adding to information in a received signal the address of a node to which a signal including said information is to be routed when said information is for another node. Thus, each node can easily pass on information intended for other nodes.

The addressing means may include means for determining the route of information through the system and adding an appropriate address to the information accordingly.

The nodes may have means for determining the route of information through the system as a whole.

Alternatively, the route of information through the system may be determined centrally by a central system controller. Thus, there may be provided a central system controller for determining the route of information through the system. The system may be used for passing control signals from the central system controller to each node.

At least one node may have means for determining if a received signal includes information for said at least one node and processing means for processing information in a signal addressed to said at least one node. All nodes may operate in this manner.

The transmitting means of the nodes preferably transmit signals at a frequency of at least about 1 GHz. A frequency greater than 2.4 GHz or 4 GHz may be used. Indeed, a frequency of 40 GHz, 60 GHz or even 200 GHz may be used. Beyond radio frequencies, other yet higher frequencies such as of the order of 100,000 GHz (infra-red) could be used. (The UK Wireless Telegraphy Act 1949 defines the upper frequency limit for the radio spectrum as $3 \times 10^{12}$ Hz.) The receiving means are arranged to receive signals at the frequencies transmitted by the transmitting means. It will be understood that, at least from a practical technical point of view, a greater bandwidth is more easily obtained if a higher frequency is used with suitable modulation.

The link between two nodes may be arranged to use simultaneously two or more frequency channels. This reduces the bandwidth load on a particular frequency channel.

The receiving and transmitting means may be arranged to transmit and detect circularly polarised radiation. The transmitting means preferably includes a highly directional transmitter antenna. The receiving means preferably includes a highly directional receiver antenna. Each of these preferred features helps to prevent interference between nodes and also helps to mitigate the effects of multipathing.

All nodes may be substantially identical. This simplifies the implementation of the present invention and helps to keep down costs.

The system can effectively be a self-contained network. On the other hand, by way of example, the system may be an access network connected to a conventional trunk network for providing access to subscribers or to other networks. A further node may be connected by a data connection to one of the nodes of the system and arranged to transfer a signal to or receive a signal from the trunk network or both.

One or more data storage servers can be connected to or provided at suitable nodes in the system. Various types of data can be stored on such data storage servers. For example, for so-called network computing, a user's software applications can be stored at a data storage server remote from that subscriber's node. The user accesses those applications through the system of the present invention. The applications can be easily updated by the software =producer and can be used by plural subscribers who perhaps pay the software producer on a time-usage basis. The data stored on the data storage servers could be data for videos such as films (movies). This would not only provide a distributed video-on-demand service, but, in addition, from the system operator's point of view, would allow video material to be distributed to the embedded servers using the same system possibly in a broadcast mode. In either case, frequently requested material migrates from main system libraries out to points in the system where it is required. This moderates the bandwidth requirements both for the video servers and for operator's libraries.

Plural systems, each as described above, can be provided with each system being connected to at least one other system. The connection between such systems can be a radio connection, a wired connection such as a fibre optic link, or any other suitable means.

At least one link of a node may be arranged to use a first transmission frequency and at least one other link of said node may be arranged to use a second transmission frequency. This can be used to help prevent interference between nodes.

In an embodiment, some of the nodes are allocated to subscribers and some of the nodes are not allocated to subscribers, at least some of said non-allocated nodes being solely for carrying information traffic between subscriber nodes.

According to a second aspect of the present invention, there is provided a method of communications across a network of nodes. Each node has one or more substantially unidirectional point-to-point wireless transmission links. At least some of the nodes have plural substantially unidirectional point-to-point wireless transmission links which share at least one of a receiver and a transmitter. Each of said links is to one other node only. The method comprises the steps of: (A) originating user data at one of the nodes; (B) transmitting a signal including said user data from said node to another node along a substantially unidirectional point-to-point wireless transmission link between said nodes; (C) receiving said signal at said other node; (D) determining in said other node if the signal received by said other node includes user data for a further node and transmitting a signal including said user data from said other node to a further node along a substantially unidirectional point-to-point wireless transmission link between said nodes if said received signal includes user data for a further node; and, (E) repeating steps (B) to (D) until said user data reaches its destination node.

Preferably, for each node that has plural links to other nodes, each of said plural links to another node is associated with a time slot, and each transmission step on a link of said one node occurs during a distinct time slot and each receiving step on a link of said other node occurs during a distinct time slot. The allocation of time slots to the links may be varied such that a link is selectively associated with more than one time slot.

Each node preferably adds to user data in a received signal the address of a node to which a signal including said user data is to be routed when said user data is for another node.

Each node may have addressing means, the addressing means determining the route of the user data through the system and adding an appropriate address to the user data accordingly. Alternatively, a central system controller determines the route of user data through the system.

The method preferably comprises the step of each node transmitting a signal including said user data to another node if and only if a signal received at said node includes user data for another node.

The method preferably includes the steps of determining in at least one node if a received signal includes user data for said at least one node and processing the user data in a signal addressed to said at least one node.

Preferably, the signals are transmitted at frequencies greater than about 1 GHz.

There may be at least two possible paths for transfer of data between a source node and a destination node. In such a case, the method may comprise the step of transmitting a copy of said data on each of said at least two paths. Alternatively, the method in such a case may comprise the steps of: transmitting from the source node a part only of said data on each of said at least two paths and reconstructing the data from said transmitted parts of said data in the destination node. This can increase the effective bandwidth of transmissions and allows redundancy to be achieved.

According to another aspect of the present invention, there is provided a telecommunications switching apparatus, comprising a communications system as described above.

Embodiments of the present invention will now be described by way of example with reference to the accompanying drawings, in which:

FIGS. 16 and 17 show examples of routing algorithms; and,

Figure 1:
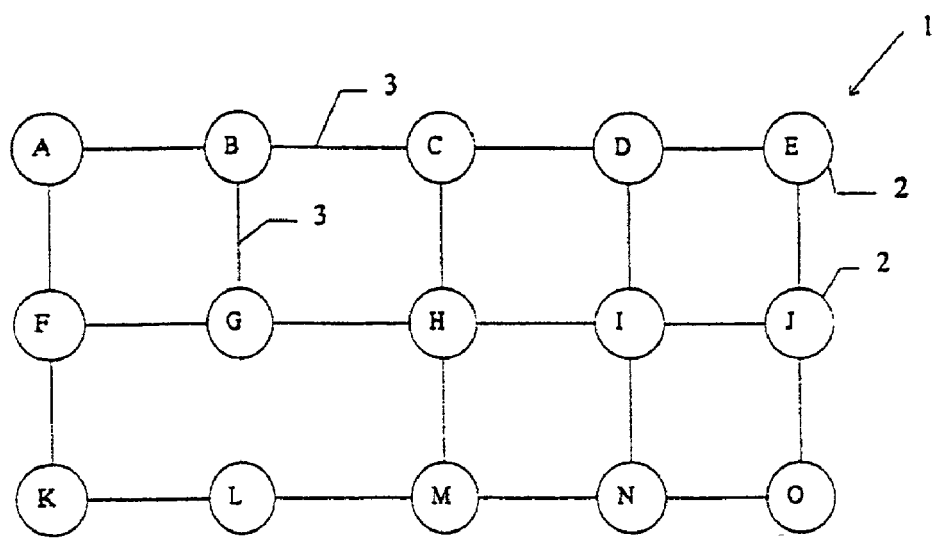
FIG. 1 is a schematic representation of a first example of a system according to the present invention.

In an arbitrary network having a total of N nodes and a total of E interconnections or links, at each node the traffic flowing into it minus the traffic flowing out of it must be the net traffic introduced by the subscriber associated with that node (neglecting any buffering). If $T_{ij}$ represents the traffic flowing from node i to node j, and $B_i$ the user traffic at node i, then the following must be true at any instant of time:

$$\Sigma_{i=0,N} T_{ij} = B_j, \text{ and } T_{ij} = -T_{ji}, \text{ and } T_{jj} = 0 \text{ for } j=0 \text{ to } N$$

(Traffic Constraint Equations)

Treating the link traffic $T_{ji}$ as unknowns, and the user traffic as known, there are N+E constraint equations and 2E unknowns, where the exact topology of the network dictates how N and E are related. There are two network topology classes of interest for present purposes, namely topologies for which $N \geq E$ and topologies for which $N<E$.

The first type of network topology with $N \geq E$ implies that the traffic equations above are completely constrained, i.e. the traffic flowing in any link is completely determined by the known subscriber traffic injected/removed from the network. Networks of this type can be constructed by adding only one new link every time a new node is added. Regular forms of such networks are for example one-dimensional chains and trees (where E=N−1), the topologies encountered in conventional access networks. Another property of these networks is that there is only one possible route between any two nodes (without traversing any link twice): there are no loops. Network systems having topologies with N=E may be single chain loops, possibly combined with linear chains and trees; for these systems, there is a maximum of two paths between any two nodes.

The other class of network topology, where the number of possible links exceeds the number of subscriber nodes (N<E), is of more interest for the purposes of the present invention. This is for two main reasons. First, there can be several distinct paths between any two nodes. Second, because the traffic equations are under-constrained, the traffic flowing on a link is not only a function of the subscriber injected/removed traffic, but also a function of the traffic on other links. This leads to a large number of possible traffic configurations for any given subscriber traffic. These are highly desirable properties because (i) the point-to-point capacity of the network is increased relative to chain and tree topologies, (ii) it allows scope for network management strategies to alter traffic flows in parts of the network to prevent congestion without, in principle, adversely affecting the traffic carrying-capacity of the network as a whole, and (iii) as will be shown later, the spectral efficiency of the system can be greatly improved over conventional cellular radio techniques.

To achieve the above desirable properties, the network is preferably constructed such that multiple paths between arbitrary nodes are possible, i.e. the network contains transmission path loops.

Even in networks in which N<E, connections to trunk networks form potential bottlenecks where diverse traffic streams are forced through a single link. This implies that the capacity and location of trunk network connections will need to be planned with care. Conventional access networks are dimensioned on the 80/20 rule-of-thumb, that is, by judicious choice of region, approximately 80% of the traffic generated by subscribers is confined to that region, with only 20% requiring access to the trunk network and this approach can be applied in the present invention.

Figure 2:
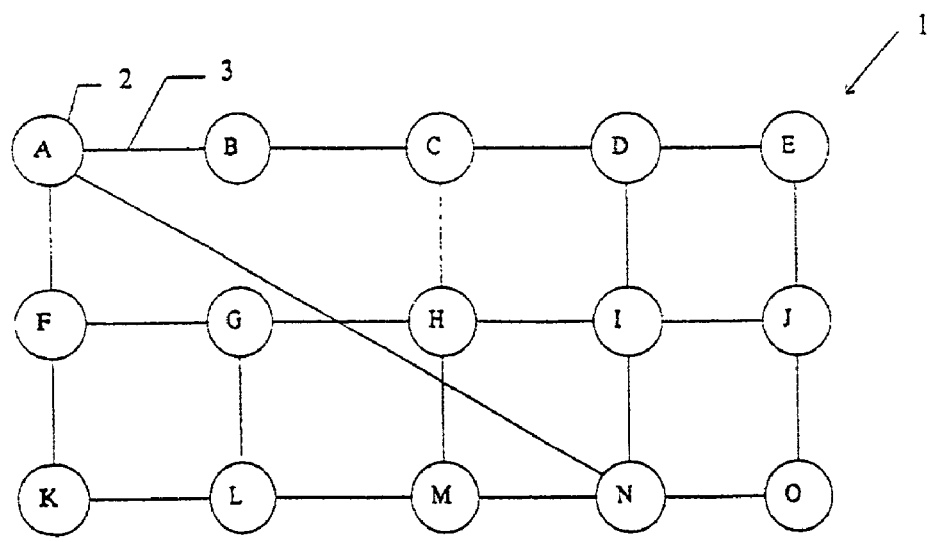
FIG. 2 is a schematic representation of a second example of a system according to the present invention.

The capacity of the network or "web" depends on how the nodes are actually connected. Consider the example of a network 1 shown in FIG. 1 in which each node 2 has a link 3 with its nearest neighbours only. (It will be understood that the lines which represent the links 3 between nodes 2 in the drawings are only schematic and show which nodes 2 are connected to which other nodes 2 via point-to-point line-of-sight wireless transmissions.) The links 3 between nodes 2 will typically be carrying information not just for the neighbouring nodes but also for nodes further down the path. The amount of bandwidth required for a given bandwidth 'delivered' will depend on the proportion of the bandwidth to be passed on by a node, compared with that being delivered to the node. This in turn depends on the average number of 'hops' that a piece of information has to make to get to its destination. The number of 'hops' taken to get from one node to the next depends on exactly how the nodes are connected. In the example of FIG. 1, if information is to be sent between A and O, a route such as ABCDEJO has to be used, requiring a lot of hops. However, if the network were as shown in FIG. 2, the route could be ANO, requiring many fewer hops.

Thus, it is desirable to find ways of connecting nodes that minimise the number of hops and maximise the number of nodes connected, while at the same time keeping the number of links per node to a reasonable number. This latter point is important since, trivially, a fully interconnected web in which all nodes linked to all others is clearly the best in that number of hops required to transmit between any two nodes is only one, but the number of links per node is equal to the number of nodes and so becomes large very quickly.

One way of looking at the number of hops (H) problem is to consider the access area serviced (A) to be randomly populated with N subscribers. On average, the width of the area will be $\approx \sqrt{A}$ and the mean distance between subscribers will be $\approx \sqrt{(A/N)}$. Thus, the number of hops across the region will be $H \approx \sqrt{N}$, assuming most nearest neighbours are interconnected. In networks of the order of $10^6$ subscribers, this implies 1,000 hops to traverse the network. Given that each hop introduces a finite delay ($t_d$) into the traffic streams retransmitted, it is essential to minimise the product of $t_d$ and H. A total end-to-end delay of <50 ms is a useful target. For nearest neighbour connectivity, this means that the individual node delay must be <50 µs. It is clear that nearest neighbour interconnection schemes will probably give rise to unacceptable traversal delays where the number of nodes is relatively large.

A mix of nearest neighbour and more remote point-to-point (line-of-sight) connections may therefore be appropriate. In this way, the number of hops across the network is related more to its line-of-sight properties than its subscriber density. For example, if the mean line-of-sight distance for a particular network is L, then $H \approx \sqrt{A/L}$, and so if $L > \sqrt{(A/N)}$, the number of hops across the network will be significantly reduced.

Figure 3:
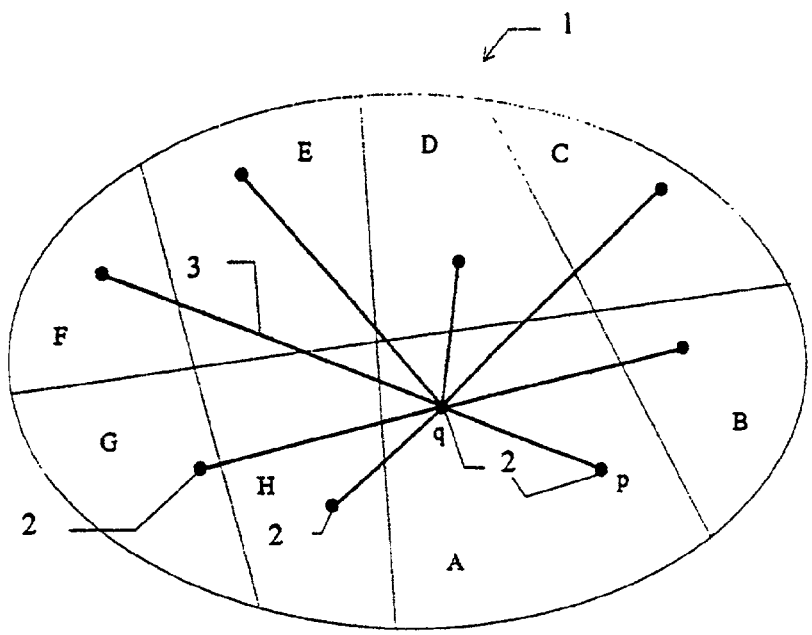
FIGS. 3 and 4 are schematic representations of further examples of systems according to the present invention.
Figure 4:
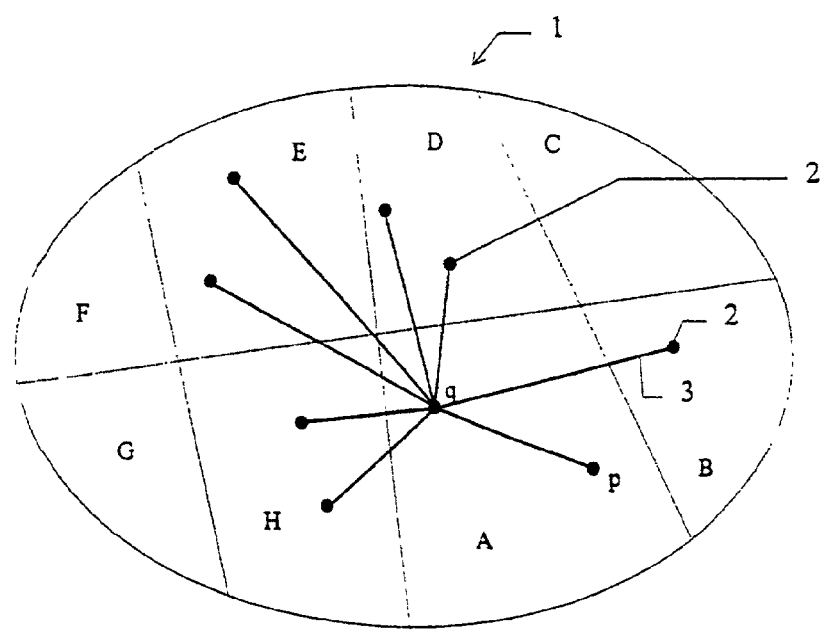

A simple method of ensuring that a system or web 1 of the present invention does not have a nearest neighbour-only topology will now be described with reference to FIGS. 3 and 4. As shown in FIGS. 3 and 4, part or all of a web 1 is notionally divided into M (arbitrary) geographical regions of roughly similar populations where M is the maximum valence of a node, i.e. M is the maximum number of links 3 which can be supported by a node 2. In the example shown, M is eight. In practice, any such geographical division will have to take account of lines-of-sight available. (Note that other nodes 2 in the web 1 and their connections have been omitted from FIGS. 3 and 4 for clarity.)

Looking at region A in FIG. 3, it can be seen that the node q in region A has been connected by a link 3 to other nodes 2 such that no more than one connection has been made to a node 2 lying in the same region. Connecting all the nodes 2 in this way will clearly ensure that webs 1 having nearest neighbour connections only are avoided. Stronger forms of this method are possible. For example, connections may be made as above, but which exclude any connection to a node 2 (such as node p) in the same region. In practice, the exact form of strategy adopted will depend on the geography and the ultimate range of a node 2. Another variant of the above scheme, which could be used where node range was restricted, would be to connect only to neighbouring regions, within range, as shown in FIG. 4.

It is important to know what bandwidth is required on each of the links in order to set up links of bandwidth B between randomly chosen pairs of nodes until all nodes are connected. Now, to answer this question fully is complex because it depends on the required traffic characteristics and the permissible routing algorithms, and would require the general solution of the constraint equations above. However, the following gives a simple calculation to find the required bandwidth b of a link to sustain traffic in a web or network, where each node in the web is sinking and sourcing bandwidth B. For a network which can cope with arbitrary, symmetric subscriber interconnections, ideally:

$$b \approx B \qquad (1)$$

i.e. the required link bandwidth should be independent of the number of subscribers in the network and be of the order of the offered traffic at each node.

Assume that the network is a non-nearest neighbour web, and, as a worst case, that the data a node is sinking/sourcing is being exchanged with the most distant node in the network. Since the number of nodes in a web is N, and if each node is sending data to one other node, then there are N connections active. For this web, assume that there are n hops on average between a node and the most distant node from it.

The subscriber traffic therefore requires nBN units of bandwidth from the network. Now, if the web has E links each of which can carry 2b units of data (b in each direction), the network therefore has 2bE units of bandwidth available. Thus if routing issues are ignored, then 2bE=nBN.

Thus, each link carries traffic of bandwidth nBN/2E. If $b \approx B$, then $nBN/2E \approx B$, or $nN/2E \approx 1$, so that:

$$n \approx 2E/N \qquad (2)$$

Thus the link bandwidth constraint (1) implies a constraint on the mean number of hops across the web (2) in terms of the number of nodes and links comprising the web in that from the point of view of desirable bandwidth properties, the quantity 2E/N should be of the order of the mean number of hops across the web.

In a practical system, n should be as small as possible for real-time services, as large n means larger transit delays. However, since E/N is related to the number of loops possible in the web, this should be as large as possible to exploit the desirable properties outlined above. In practice, a compromise value must be found.

To examine traffic congestion issues, a symmetry argument together with a simple conceptual routing algorithm for the web may be used. One simple routing algorithm specifies that traffic going from one node to a second node will be split evenly at each intermediary node over each of the links leading further towards the destination. This could be done by, for example, a simple statistical multiplexing scheme. Thus for the first half of the journey the traffic is smeared out over the web, and for the second half the traffic concentrates towards the destination node. If only a single connection were active, then with this algorithm the traffic density would be higher around the two terminal nodes and sparser between them. When all the connections are active, the contributions to traffic density will tend to average out, depending on the web symmetry. If there is a high degree of symmetry throughout the web, the number of traffic "hotspots" will be minimised and the routing will tend not to block. Thus, to increase the load-balancing properties of the network, it is desirable that the topology be as symmetric as possible.

It is instructive to consider what the above traffic properties mean in a radio context. If it were possible to create webs of nodes with the above properties, N nodes could be interconnected with links of bandwidth B using only a radio spectrum of B Hz (using the simplifying assumption of one bit per hertz). In fact, for practical reasons, this cannot be easily achieved (and this is discussed in detail later), but this property is extremely important as it shows that this structure is fundamentally very much more spectrally efficient than the cellular architecture, as will be discussed further below.

Figure 5:
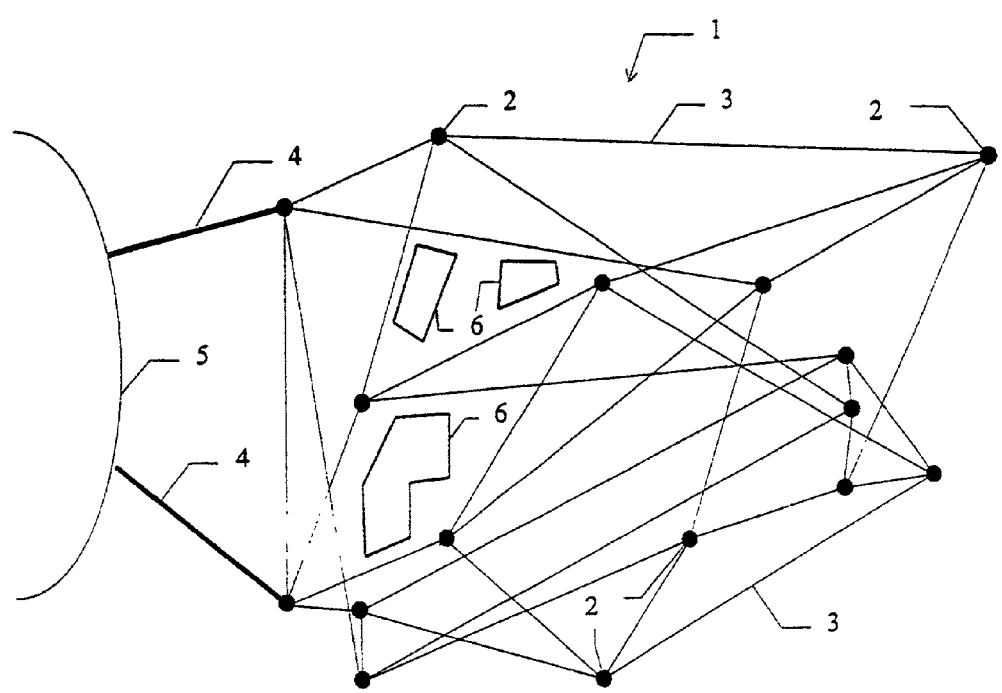
FIG. 5 is a schematic representation of a further example of a system according to the present invention.

A simple practical example of a network or web system 1 according to the present invention is shown in FIG. 5. In the example shown, there are sixteen subscribers or users, each of which is associated with a network node 2. The system 1 is connected via interconnect trunks 4 which connect specified nodes 2 to a trunk network 5. Each node 2 has a radio transceiver unit which is able to transmit and receive high radio frequency signals, for example at least 1 gigahertz (GHz) or 2.4 GHz or 4 GHz or even up to or greater than 40 GHz. The transceiver unit of each node 2 is in direct line-of-sight contact with four other similar units at other respective nodes 2 by direct line-of-sight links 3. Again it will be understood that the lines which represent the links 3 between nodes 2 in FIG. 5 are only schematic and show which nodes 2 are connected in a point-to-point manner to which other nodes 2 via wireless transmissions. It can be seen from FIG. 5 how the nodes 2 of a system or web 1 according to the present invention can communicate with each other via other nodes 2 if necessary to avoid buildings 6 or other obstructions which otherwise block the direct line-of-sight connection between particular nodes 2. It should be noted that each node 2 in this example of the system 1 be connected to the same number n of other nodes in a hypercube topology. This results in efficient use of the system 1. However, it is possible for some nodes in the system 1 to be connected to less than n other nodes in a less-than-perfect hypercube.

As mentioned above and as will be further explained below, a message from any one particular node 2 to any other particular node 2 will usually traverse several links 3 between several nodes 2 in a series of "hops" across the system 1. Each passage of a signal through a node 2 produces a delay in transfer of the signal. The delay might be only a millisecond or so, but if there were a very large number of nodes, this delay could rapidly build into significant fractions of a second. Such relatively long delays would not be generally acceptable in interactive services such as voice traffic, video conferencing, etc. Thus, it is highly desirable to minimise the maximum number of hops required by a signal in transferring across the system 1. For example, the hypercube structure provides an efficient way of connecting many users with a small number of maximum hops required to transfer a signal between a source node and a destination node.

Furthermore, each link 3 has a certain fixed information carrying capacity, determined in large part in practice by the bandwidth of the carrier signal used to transmit information between nodes 2. Each link 3 carries information data intended for a node connected to the link 3 and also "transit" data intended for other nodes. Indeed, each link 3 carries approximately n times the amount of transit data for each information data carried by the link. Thus, it is generally better to have a relatively small number of links 3 between nodes 2 (i.e. a small dimension topology) because this increases the bandwidth available to each message as fewer messages in total have to be carried by each link 3.

In a system having a hypercube-type topology, if each node is linked to n other nodes, the maximum number of nodes in such a system, which is equivalent to the maximum number N of users of the system, is $2^n$ where there is just one subscriber per node 2. The maximum number of hops required to transmit information from any node to any other is n. The total number of links $E = n \cdot 2^{(n-1)} = (N/2)\log_2 N$. There are n! possible topologically equivalent routes for information to cross the system, meaning that good service can be maintained for the vast majority of users even if one or more individual nodes fails for some reason as other routes for messages to cross the system can be found. For example, to service a region of 65,536 users using a hypercube topology, where, for simplicity, there is one user per node, n=16. In other words, for a system for 65,536 users, each user node needs to be connected to 16 other user nodes and a maximum of 16 hops are required to transmit information from any one node to any other node in the system.

Topologies having a high degree of node interconnectivity support many possible equivalent routes through the system 1, each having a relatively low number of hops. Node complexity, in terms of the number of links 3 required by each node 2, scales only very slowly with the size of the system 1 in a topology such as a hypercube topology. The ratio of user bandwidth to the resultant link bandwidth is low, possibly less than unity because of the multiple routing possibilities. Nodes 2 can be low cost because of the modest bandwidth requirements. The nodes 2 can be identical, leading to low installation costs and ease of operation, management and maintenance.

The factors which will decide the optimum topology to be used include message traffic patterns, geography of the land in which the system is implemented, user location density, and system application (e.g. video-on-demand or Internet web-browsing).

Figure 6:
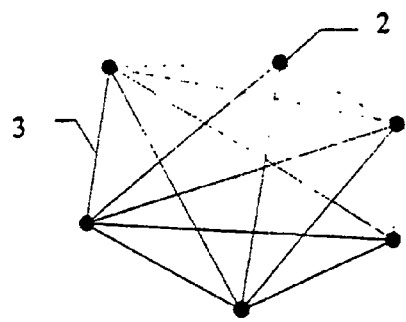
FIGS. 6 to 9 are schematic representations of different topologies for the system of the invention.

One alternative topology is a fully interconnected topology shown by way of example in FIG. 6. Each node 2 is connected to each other node 2 and thus for an N node network, each node 2 must support (N−1) external links 3 to other nodes 2. The total number of links 3 is therefore N(N−1)/2. This topology is most suited to a relatively small number of nodes 2, for example where N is less than 10. Adding nodes 2 to such a system 1 means that all existing nodes 2 must be modified to interconnect to any new node 2. The main advantage of such as system 1 is that only one hop is required to transfer a message from any one node 2 to any other node 2. Thus, a fully interconnected topology is most suited for connecting a small fixed number of nodes 2.

Figure 7:
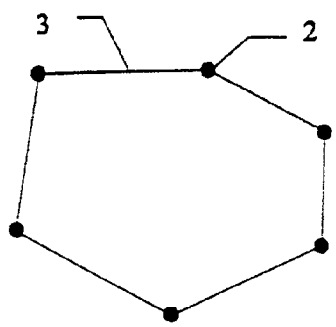

Another alternative topology is a linear chain topology shown by way of example in FIG. 7. Each node 2 is connected to two others. In a system 1 of N nodes 2, there are thus N links 3 and information will require N/2 hops to cross the system 1. Because all message traffic is concentrated onto the chain of links 3, each link 3 must be of high bandwidth (approximately N/2 times the bandwidth required by each node 2), which may limit the number of nodes which can be connected in such a topology. A main advantage of such a topology is the comparative simplicity of the nodes 2 which each have only two external links 3.

Figure 8:
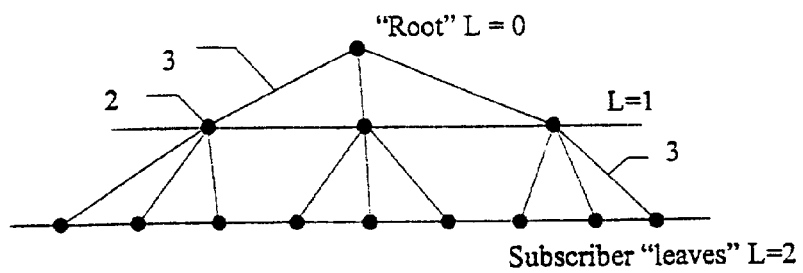

A further example of a suitable topology is a tree topology as shown by way of example in FIG. 8. In a homogeneous tree topology, every node 2 is connected to a fixed number of other nodes 2 in such a way that there are no "loops", i.e. there are no paths which can be followed which pass through the same node 2 more than once. For a tree with nodes 2 connected to J other "lower" nodes 2, and having L levels, the number of nodes 2 is the geometric series:

$$\sum_{k=0}^{L} J^k = \frac{1 - J^{L+1}}{1 - J}$$

which for large J tends to $J^L$. A disadvantage of this topology is that at each hop away from a node 2, the nodes 2 must service J times the peak bandwidth of the node connection, implying greatly increased bandwidth requirements on descending the tree. Another disadvantage is that the nodes 2 differ between levels as they must function differently meaning that a system provider must deploy and manage different nodes for each level. However, an advantage is that at most two hops are required to transmit a message from any node 2 to any other node 2 in the same level (for example, the lowest level in FIG. 8).

An inhomogeneous tree topology relaxes the requirement for the number of connected lower nodes 2 to be fixed, though in other respects is similar to the homogeneous tree topology described above.

Figure 9:
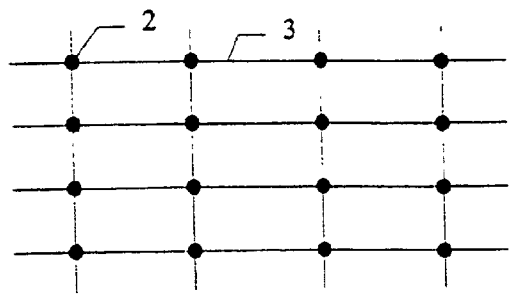

A yet further example of a suitable topology for connecting the nodes 2 is a lattice topology shown by way of example in FIG. 9. Nodes 2 are connected in an arbitrary manner to up to a fixed number n of nearest nodes 2. In a grid structure a portion of which is shown in FIG. 9, where n=4 and serving say N=10,000 nodes 2, a message may require $\sqrt{N}=100$ hops to cross the system 1, which may lead to unacceptable traversal delays. Also, the bandwidth requirements of each link 3 may be high as it will be approximately $(\sqrt{N})/2$ times the bandwidth required by each user.

It will be appreciated that whatever topology is selected for the system, it must be flattened onto the effectively two dimensional geography of a geographical region, inevitably leading to a requirement for some links 3 to be longer than others. With present technology, high frequency transmitters transmitting say 40 GHz frequencies only have a range of about 500 m to 2 km or perhaps at best up to about 4 or 5 km. There is therefore a problem in providing links 3 between nodes 2 which are more than about 2 km apart. This can be overcome by limiting a system to a relatively small number of nodes 2, say 1,024 nodes 2. Such a system 1 can then be connected to other similar systems 1 of the same or similar size using a large antenna and radio link, a fibre optic link, etc. Systems 1 having different topologies can be connected to one another.

The network 1 may effectively be a mixture of topologies.

In the preferred embodiment, there are multiple links per node orientated in arbitrary directions. This could be achieved with multiple radio systems per node. However, when compared with a typical cellular system which would only have one radio system per subscriber, this is likely to make the nodes significantly more expensive than their cellular equivalent. This is especially true when the radios are operating in the high GHz where this element of the system is likely to be a significant part of the node cost.

To achieve 360 degree angular coverage at a node, it is possible to use one or more antennas which are steerable either electrically or physically and which can point in any azimuthal direction, or an array of fixed antennas each pointing in a different direction such that any particular direction is accessible from one of the antennas.

The exact number M of antennas must be chosen to allow complete angular coverage without adversely affecting link gain. Note, M may be greater than n, the maximum active links per node. However, rather than providing M pairs of transceivers at each node, each pair being continuously connected to a single antenna, for cost reasons it is preferred to use only one transceiver per node and make use of time division multiplexing (TDM) and time division duplex (TDD) techniques to connect the transceiver to an antenna. A node therefore has only one transceiver pair which must be able to use all M antennas. TDM can be used to time-share the antennas with the transceiver. TDD can be used to alternate the receive/transmit operation of the node radio so that it is never receiving and transmitting simultaneously. Frequency division multiplexing or code-division multiplexing could be used as alternatives to TDM. Frequency division duplex could be used as an alternative to TDD. Other alternative schemes may be possible.

Figure 10:
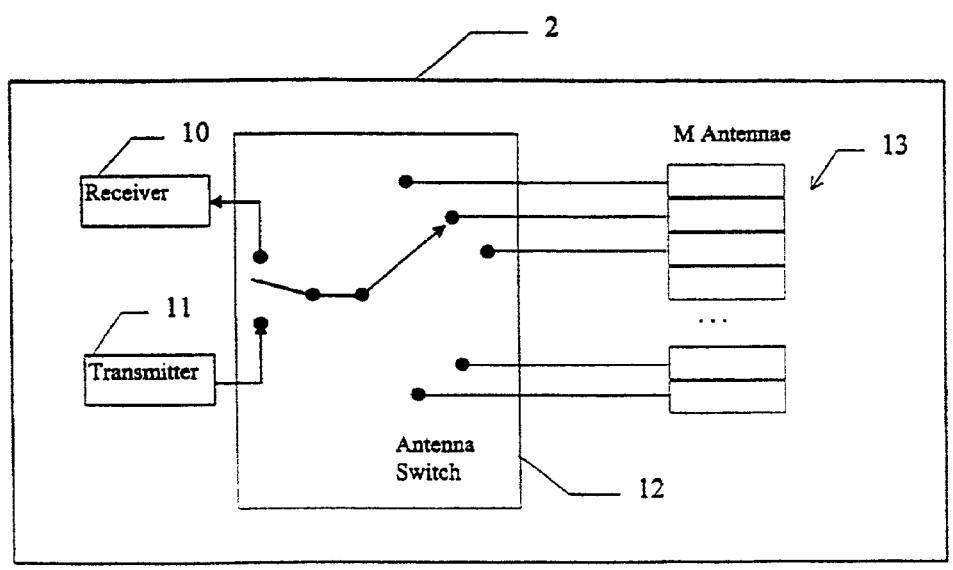
FIG. 10 is a schematic illustration of a node showing the radio components.

The basic structure of the radio frequency parts of a node 2 is shown in FIG. 10. A receiver 10 and transmitter 11 are alternatively connected to an M-way switch 12 which conducts radio-frequency (RF) power from and to the antennas 13.

Figure 11:
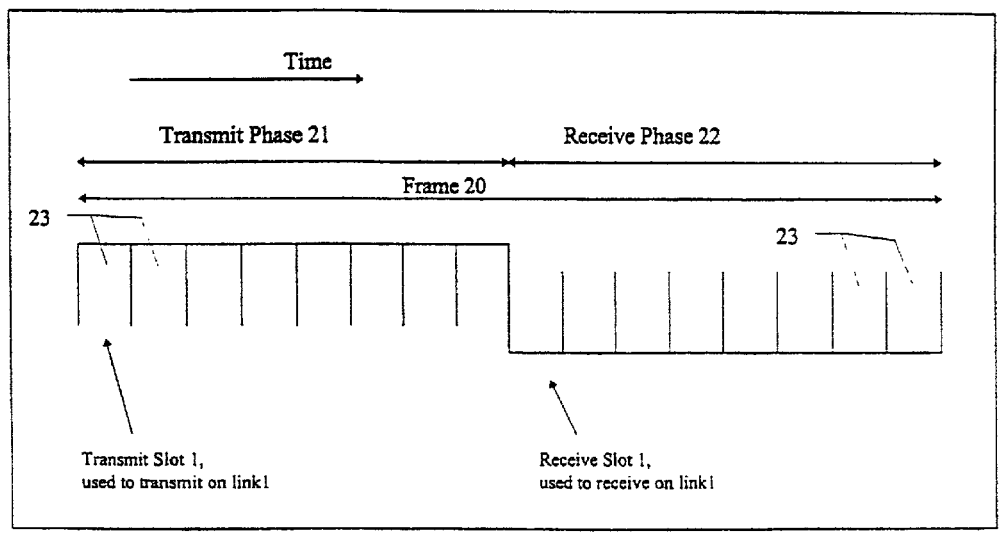
FIG. 11 is a schematic representation of a time slot structure of a node timing frame.

A simple scheme of scheduling the connection of antennas 13 is shown in the time slot structure in FIG. 11 for the case M=8. Time is divided equally into "frames" 20 and each frame 20 is divided equally into a transmit phase 21 and a receive phase 22. The transmit and receive phases 21,22 are themselves divided into equal time slots 23. Each one of these time slots 23 is used for one link 3 from a node 2. Thus, the node 2 transmits in one time slot 23 on one link 3 then the next time slot 23 on the next link 3 and so on, followed by receiving in one time slot 23 on one link 3 and the next time slot 23 on the next link 3 and so on. Each receive time slot 23 of each node is arranged to be long enough to ensure that there is sufficient time for a signal transmitted from other nodes 2 to travel to the node 2 in question and also to be received in full at the node 2 in question, particularly to ensure that the data packet and any guard bands are received.

In-turn sequencing is not the only possible way of addressing antennas 13. The total bandwidth available at a node 2 can be partitioned by allocating more or fewer time slots 23 to an antenna 13, within a receive or transmit half frame 21,22. This is illustrated in the matrices in FIG. 12. The columns of the matrices represent the eight antennas 13 on an example node 2, and the rows eight possible receive/transmit time slots 23. A '1' in a cell indicates which antenna 13 is active during which time slot 23. A '–' in a cell indicates no activity of an antenna 13 in a particular time slot 23. The number of '1's must not exceed the total number of time slots 23 available.

Figures 12A, 12B, 12C, 13:
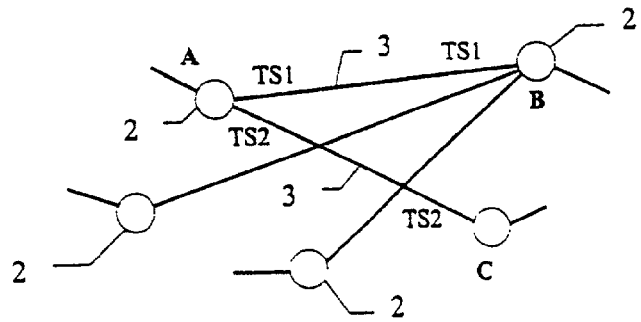
FIGS. 12A to 12C show matrices for explaining the allocation of time slots to links.
FIG. 13 is a representation of a portion of an example of a system according to the present invention showing synchronism of time slots.

In FIG. 12A, each antenna has a time slot, so each link can carry 1 unit of bandwidth. In FIG. 12B antenna A0 has two time slots allocated, and hence can carry two units of bandwidth. Antennas A1, A2, and A7 each have one time slot allocated, and antenna A4 has three time slots allocated. Antennas A3, A5, and A6 have no allocated time slots and hence are idle. In FIG. 12C all the time slots have been given to antenna A4. This means that link associated with antenna A4 can carry eight units of bandwidth whilst all the others are idle.

It may be noted that whilst TDM/TDD is used to divide up time between links 3, this does not imply that the time a link 3 spends active is also divided into time slots. As each link 3 connects only two nodes 2, there is no need for a further time-division structure, for multiple access purposes, on a link 3 for the purposes of the present invention.

Considering now the need for synchronisation of transmission and reception by the nodes 2, if any one of the nodes 2 is transmitting then all the nodes 2 to which it is transmitting must be receiving. This is only possible with certain web topologies. Many topologies satisfy this transmit/receive phasing if all transmission path loops in the web have an even number of sides.

Not only must communicating nodes 2 be transmitting or receiving in synchronism but they must agree on the time slot number that they are using. Referring to FIG. 13, nodes A and B must both be using the same time slot for the link 3 between them, say time slot 1 transmit for A and time slot 1 receive for B. Similarly, A and C must use the same time slot for the link between them, say time slot 2, etc. However, each node 2 may only use each time slot once. In the preferred embodiment, this requirement is met exactly throughout the network. Thus, each link 3 in the network 1 is assigned a time slot number such that no node 2 has more than one link of the same time slot number. In addition, it is desirable to minimise the total number of time slots required. If the maximum numbers of links per node is M, it is clear that at least M time slots are needed. For any network topology with loops having an even number of sides, if M is the maximum node valence of the network, then M time slots can be consistently allocated in this network.

It will be appreciated that different groups of nodes 2 may be communicating with each other at any one time. In other words, different transmission paths in the system 1 may be active and carrying traffic at any one time.

Figure 14:
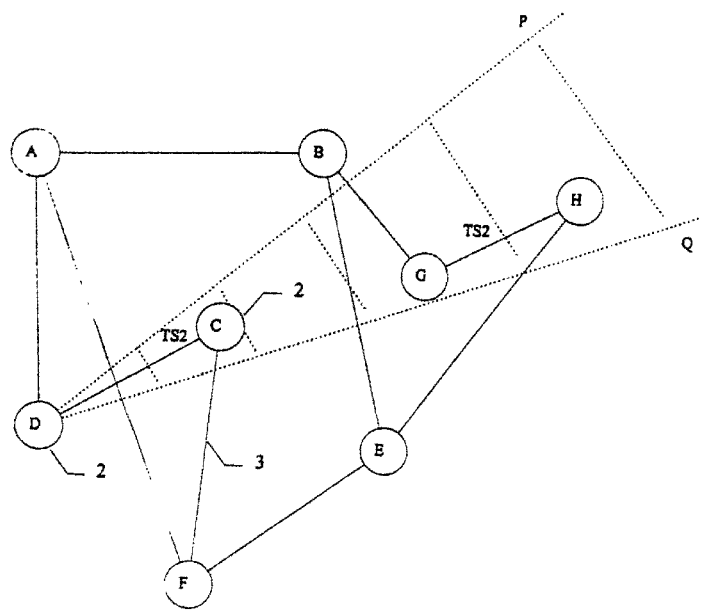
FIG. 14 is a representation of a portion of a further example of a system according to the present invention showing possible interference between nodes.

Reference is now made to FIG. 14 in which part of a web 1 is shown. Using the above described transmit/receive synchronisation and time slot allocation rules, nodes ABC-DEF will not interfere with each other. However, there may be a problem with nodes G and H. This is because the link between nodes D and C uses time slot 2. Now, the radio signal for this link will not stop at C, but will continue on and may be detected by the receiver in node H which will also be receiving during that time slot using an antenna pointing in a similar direction. In theory it may be possible to design network topologies which somehow avoid this situation, but given the complexity of real-world subscriber positioning, this is likely to be infeasible in practice. The system in practice should therefore be arranged so that, even though the geometrical arrangement is as shown, the fact that D's signals are detectable at H does not cause interference to the signals received at H from E.

This can be achieved by using a set of frequency channels and assigning one of these to each link in the network in such a way that all potentially interfering links are on different channels. The set of channels should be as small as necessary. This requirement for a minimum number of frequency channels is related to the beam width of the node antenna. For large widths, the area of the interference zone PDQ in FIG. 14 is also large and hence there is a greater likelihood of nodes such as G and H lying in it. Similarly, for small beam widths, the zone area is small, thus containing fewer nodes.

In the example shown, this would mean that link DC is on a different frequency channel to link GH. Allocating frequency channels is a complex task. Some system modelling has been done to investigate this issue with the outcome that the frequency reuse factor is similar to the cellular case, i.e. somewhere between 6 and 10.

The implication of this on design of the nodes 2 is that the radio system must be frequency-agile, re-tuning to a different pre-allocated channel on each time slot.

As with all communication systems, individual links 3 are liable to suffer from interference and damage. Very short timescale problems are handled by standard means, including Forward Error Correction and re-transmissions. On occasion, a link 3 may suffer problems that effectively make it useless. However, with a web according to the preferred embodiment, there will always be a large number of equivalent routes between any two nodes 2 so the loss of some links 3 can be countered by re-routing the connection.

Link loss occurs on several timescales. In the medium term, a temporary loss for some seconds or minutes may be caused by large vehicles moving nearby, or perhaps a plume of smoke from a fire. The network will cope with these by re-routing traffic to avoid the problem areas until the link recovers. On a longer timescale, a link 3 may be lost because line of sight is being permanently obstructed. This may be caused by new building or tree growth. These losses should be handled at a network planning level. As a background activity, the network may constantly monitor all available lines of sight, (i.e. links 3 between nodes), including those which are not currently being used for subscriber traffic. On a timescale of hours and days, or even minutes or seconds, the network can be automatically reconfigured to use different subsets of the available lines of sight to optimise operational parameters.

Some subscribers may have very stringent requirements for link availability and require high integrity links so that their communications are not vulnerable to single point failure. When carrying such traffic, multiple paths (m) through the network may be used. Two methods of operation are possible. In the first, each path carries a duplicate of the subscriber data, so that the receiving node 2 may accept data from any active path. This uses up m times the basic subscriber bandwidth (B) for the connection, but is simple to implement. In the second, each path carries part of the subscriber data (with some additional parity information) so that the receiving node 2 can reconstruct the data from any m−1 paths received and the parity information. This uses in total only αB units of bandwidth (α=parity information overhead>1). The second example of method of operation can be extended to protect against multiple path failures but is more complex than the first example of method of operation.

The availability of multiple paths is an inherent property of the preferred embodiment of a web network 1 of the present invention. By comparison, provision of multiple physical paths in a cable or wire based network is enormously expensive.

In above description, one time slot 23 is used to support all of the bandwidth on a link 3. This maximises the raw data transfer rate; however, it is always important to maintain spectral efficiency.

A general calculation of the spectral efficiency of a network in accordance with the present invention compared to conventional cellular approaches is not easy to calculate as much depends on the exact implementation. However, a cellular approach requires approximately:

$\alpha.N.B_{subs}.F_{cell}$ units of bandwidth, where:

α is the maximum fraction of active subscribers

N is the number of subscribers $B_{subs}$ is the bandwidth required by a subscriber $F_{cell}$ is the cellular frequency reuse factor, and assuming a modulation technique giving one bit/Hz.

The present invention requires approximately $n.B_{link}.F_{web}$ units of bandwidth, where:

n is the maximum number of links/time slots on a node $B_{link}$ is the bandwidth of a link $F_{web}$ is the frequency reuse factor needed to minimise interference in the present invention, again assuming a modulation technique giving one bit/Hz.

$F_{cell}$ is typically in the range 6 to 10 and computer modelling has shown $F_{web}$ to be much the same. Computer modelling has been carried out for a number of scenarios and a reasonable set of parameters is that n=8 and that $B_{link}$ is equal to $B_{subs}$.

This gives the efficiency of the web approach to the cellular approach as:

$(\alpha \cdot N)/n$

For a cell covering 1000 users and a peak active load of 20% (a typical estimate for video-on-demand services), the relative efficiency is 25 fold. This is extremely important as there are many demands on radio bandwidth and as a matter of practice the regulatory and licensing authorities are only able to license relatively narrow regions of the radio spectrum. The present invention places much lower demands on the radio spectrum than a cellular system providing a comparable user bandwidth.

A simple example of a routing protocol will now be described. The system 1 is well suited to the use of asynchronous transfer mode (ATM) technology which can support connection oriented (circuit switched) or connectionless (packet switched) traffic modes by the transfer of 53 byte information "cells".

In a hypercube topology network with n connections at each node 2, each out-going connection can be labelled with an index (0 . . . n−1). A path through the network system 1 can then be defined by a list of such indices. As will be understood from the above, the maximum length of this list will be n entries.

In general, an information packet can be defined to be of type Message which has two components:

information cell payload (cell), and the routing address (L).

Figure 15:
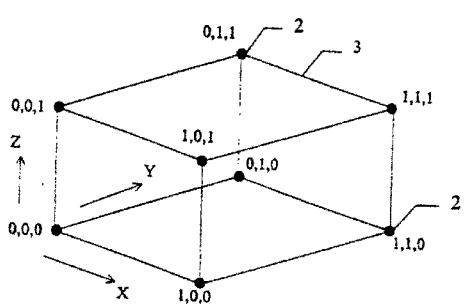
FIG. 15 is a schematic representation of a simplified system for explaining the addressing of signals within a hypercube topology.

The routing address is the absolute address of a node 2 in the network system 1. Each node 2 will have access to its own address (my_L in the code discussed below). To see how addressing works in such a system 1, consider the addressing of points on a simple unit 3-cube shown in FIG. 15. Each node 2 has a labelled set of channels which can be thought of as Cartesian axes, in this case X, Y and Z. Thus each node 2 has an X-channel, a Y-channel and a Z-channel.

The address (L) of a node 2 in a 3-cube geometry is one of the eight 3-vectors: (0,0,0), (1,0,0), . . . (1,1,1). A move through the cube by one hop along a link 3 (i.e. traversal of an edge) is represented by the following relationship between the initial (L1) and final (L2) address:

$|L1-L2|=1$

Thus, a "forward" move is defined by L1−L2=1 and a "backward" move by L1−L2=−1.

The routing algorithm shown in FIG. 16 replicated in each node 2 of the system 1 will in principle ensure correct cell routing.

The function of the handleReturnedMessage function is to take appropriate action with a returned message. This strategy will depend on the type of data service supported. It could be one of the following:

1. Return the message to sender, i.e. propagate the message all the way back to the originator. This should signal to the originator that there is congestion and that it should pause sending information for a period of time.

2. Store the message for a period of time, then attempt to forward it to its destination as before.

3. Forward the message forcing a different route to be taken, for example, by choosing an output channel which has low congestion.

4. Discard the message, assuming that a higher-level data-link protocol will detect the loss and cause the originator to re-transmit the message.

The procedure SendPacket (msg, next_node) conceptually sends Message msg to the outgoing link 3 with index next_node. The procedure ProcessCell (cell) is responsible for consuming the information cell locally and making it available to the user.

The decideNextChannel function has a functionality which is network topology specific. For the case of a hypercube topology, an example of this is set out in FIG. 17, where ActiveChannels is the number of currently configured channels on a node 2 (which may vary for each node 2 in the system), and MaximumChannelUtilisation is the value at and above which the outgoing channel may be considered to be at full capacity and can therefore accept no further traffic.

Where the instantaneous utilisation of an output channel is a measure of the traffic loading of that channel over an immediately previous period of time. Such a measure of traffic loading might be one, or a combination of, the following factors:

1. The number of currently allocated communications circuits on the link
2. The amount of data sent on the link.

In addition, the ChannelUtilisation function may be used to control non-existent links as in the case of a partially complete hypercube. In this case, the link utilisation could be set permanently to MaximumChannelUtilisation.

A continuously operating function of a node would be the monitoring of this loading and allow the routing software to obtain a value related to the current loading for a given link. This is what the function ChannelUtilisation (channel) does.

The procedure MapWeightedChannelToBestChannel translates the input weighted channel index into a real output channel for the node. The simplest, non-trivial case would be where output channels are denoted by integer values, 0 to 7 for example, and the mapping of the real weighted channel number to this is simply a rounding operation. For example, weighted channel value 6.7152 is mapped to channel index 7.

The performance of the system 1 has been primarily described so far in terms of its ability to move data within a cluster of nodes 2. However, for many types of service it is required to connect into a trunk network 5, as indicated in FIG. 5. For example, in a network of say 250 users used primarily for 5 Mbps video-on-demand (VOD) service with a loading of say 0.3 Erlang per user, the total bandwidth required from the trunk network is 375 Mbps, assuming that no source material migration takes place. As the maximum input rate to a node will be say about 40 Mbps (assuming eight links 3 of maximum 5 Mbps each per node 2), this 375 Mbit/s of traffic will need to be groomed onto the trunk network at at least ten locations. This can be done in two ways.

Figure 18:
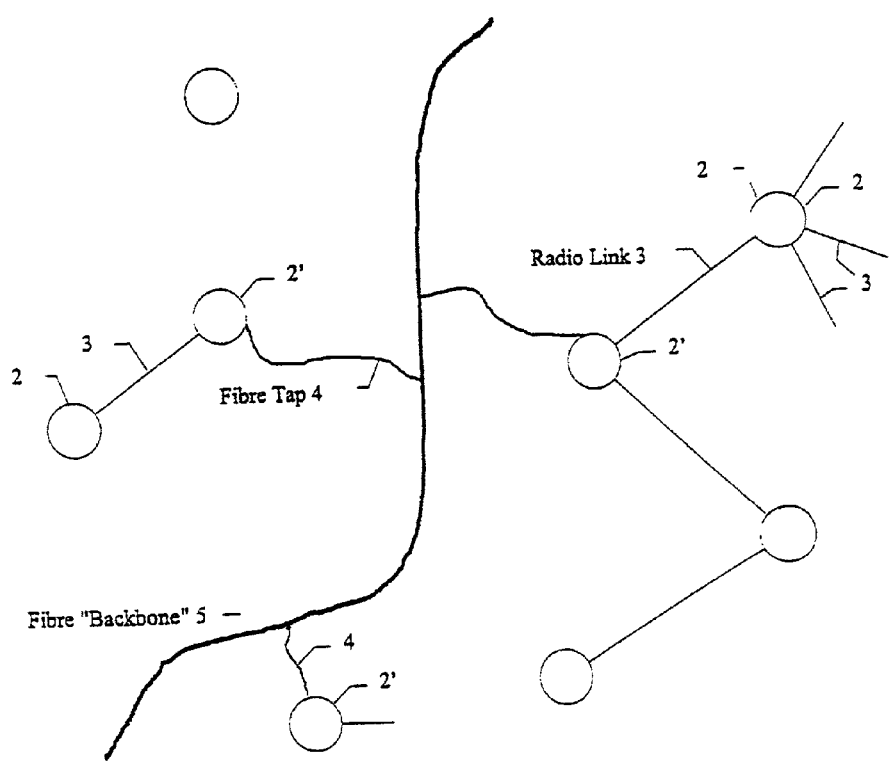
FIGS. 18 and 19 show examples of connection of systems according to the present invention to a trunk network.

The first alternative is to connect the subscriber interface of a node 2' at each of the "input" locations to a suitable interface on the trunk network 5 (e.g. DS3, STM0, 1) as shown in FIG. 18. The nodes 2' at the input locations can be connected by an optical fibre 4 to the fibre backbone of the trunk network 5 for example. These input locations can be chosen for network deployment convenience rather than by subscriber location. This is much easier than running fibre to cellular type base stations where the positions of the base stations are dictated by the cellular structure.

Figure 19:
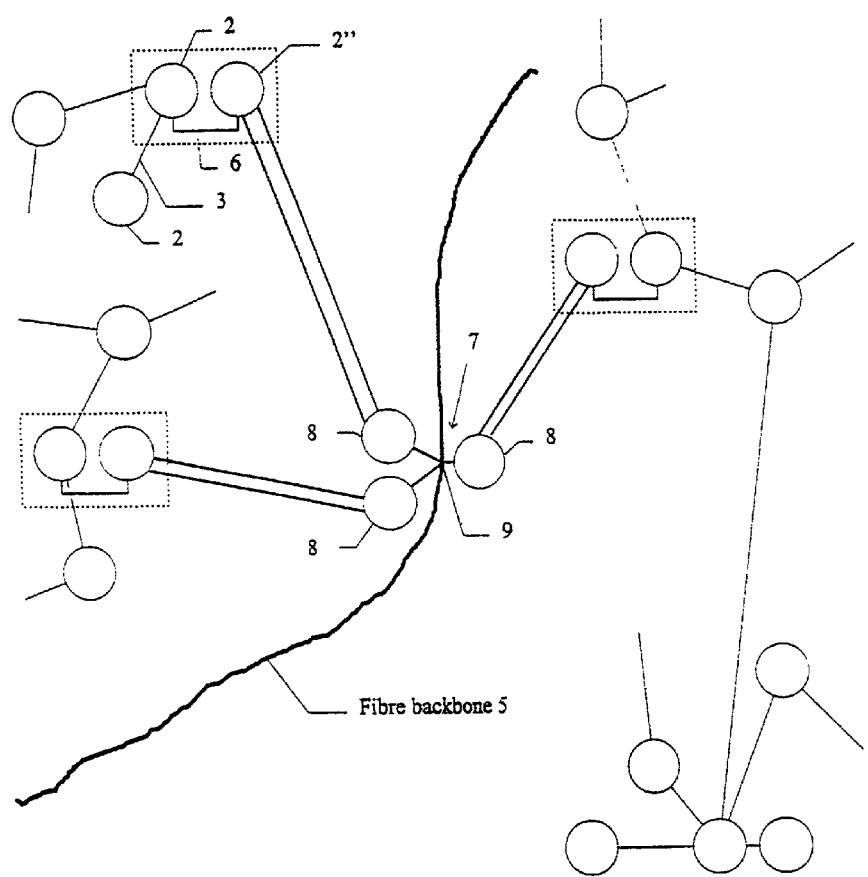

The second alternative is to configure a set of nodes 2" so that all time slots 23 are used on one link. This provides several point to point connections with exactly the right bandwidth (40 Mbps) for connection into a node 2. The specially configured nodes 2" can be connected by a suitable data connection 6 to a normal subscriber node 2 at the same location. It should be noted that these specially configured nodes 2" can use exactly the same hardware as the normal subscriber nodes 2. However, the specially configured nodes 2" could each use a high gain, long range movable antenna if required. Such antennas could be directed at a cluster 7 of suitably configured nodes 8, located at a single trunk access point 9 as shown in FIG. 19.

A problem with many radio communications systems is multipathing. This can occur when a receiver receives a main signal received directly from a transmitter but also receives signals from the transmitter which have been reflected from buildings or moving vehicles, for example. The reflected signal is delayed relative to the main signal, which can lead to cancellation of the main signal if the reflected signal is an odd number of half wavelengths lagging in phase. With medium wave transmissions, where wavelengths of several hundreds of meters are used, cancellation is not much of a problem; the user can usually find a position for the receiver where cancellation because of reflections from buildings does not occur or, where cancellation occurs because of a signal reflected from a moving vehicle, the cancellation only occurs briefly and the vehicle moves away, thereby removing the problem. However, at higher frequencies, where wavelengths might be several millimeters, objects moving past a receiver can cause frequent cancellation of the main signal by virtue of those moving objects regularly and frequently reflecting signals which lag the main signal by an odd number of half wavelengths.

In order to overcome this multipath problem should it arise in the system 1 of the present invention, it is preferred that the antennas of the transmitters and receivers in each node 2 be highly directional. With a highly directional transmitter/receiver, there tends to be better gain and therefore better signal strength than with an isotropic antenna. Thus, not only does a highly directional transmitter/receiver tend naturally to detect only the main signal coming along the line-of-sight link 3 to the node 2 and does not detect reflected signals which approach the node at an angle to the main signal, a highly directional transmitter/receiver has improved operating characteristics by virtue of the higher gain available. In addition to the high-directionality geometry of the antennas, circular polarisation of the transmitted radiation can be used to provide additional protection against loss of signal due to multi-path effects. On being reflected from a surface, a radio wave suffers a change in its phase relative to the incoming wave. If this incoming wave is right-hand circularly polarised, for example, then on reflection, this polarisation will be reversed to left-hand circular polarisation. In this way, unwanted reflected radiation is rejected relative to directly transmitted radiation if the receiver is selective to purely right-hand circularly polarised radio waves. A similar argument would apply if left-hand circularly polarised receivers and transmitters were to be used. Thus, preferably, the system 1 uses line-of-sight, highly directional, high gain, high frequency transmitters/receivers equipped to emit and detect circularly polarised radiation.

It will be appreciated that in the system 1 of the present invention, no base transmitter station is required and the system 1 can be constructed from a single type of identical transceiver unit at each node 2. The network system 1 is potentially very much easier and cheaper to build, deploy and maintain in comparison with a cellular system which uses base stations. There is no burying or suspending of cables or wires or erecting of many large base-station antenna masts, again representing a large saving in costs and also minimising the environmental impact of the system 1. The capacity of the system 1 is very large as there are many possible routes between nodes 2 and to the edge of the system 1. Failure of a particular node 2 accordingly implies loss of service for only one user and other users are not normally affected as alternative paths can be found for transmission of a signal. Because each node 2 is concerned with switching as well as the transmission of information traffic, the whole system 1 effectively behaves as a distributed switch. This means that conventional access switches, which represent significant capital expenditure, can be eliminated.

The present invention allows an operator to begin operating a communications system 1 having very high data transfer rates to a small number of users at relatively low cost. For example, 128 nodes can be set up in a system as described above at very low cost compared, for example, to equivalent cable and cellular solutions. Subscribers to the system can be allocated respective nodes 2. The remaining nodes 2 which have not been allocated to a user can be used as "strategic" nodes 2 solely for carrying information traffic between user nodes 2. As more users join the system, the strategic nodes can be allocated to the new users. As the initially implemented system 1 fills so that all nodes 2 are allocated to users, new nodes can be added and the system 1 as a whole can be reconfigured to introduce the new nodes to the system. If necessary, a similar process in reverse can be applied to remove nodes which are no longer required or which are in maintenance or have failed, for example.

The maximum bandwidth which may be delivered to a node user from the network side (Bdown) and the maximum bandwidth a user may deliver to the network (Bup) may be independently configured dynamically by the network operator without affecting the capacity of the node for transit traffic. For example, a low tariff service might be Bup<<Bdown (similarly to ADSL service), whereas a higher-tariff service might allow Bup=Bdown ('symmetric' service). Clearly both Bup and Bdown must be less than the peak user data rate allowed by the radio system.

A link 3 between two nodes 2 may actually comprise two or more parallel radio channels, i.e. the link 3 uses simultaneously two or more frequency channels, thus reducing the bandwidth load on a particular radio channel.

The overall control of routing of the signals between nodes can be by virtue of a central controller. The central controller might perform a periodic (e.g. daily) check on the system 1 as a whole to determine whether any nodes 2 have failed. The central controller 1 can then determine which route should be followed by a message from any one node 2 to any other node 2 in the system 1. Appropriate instructions could then be sent from the central controller to each node 2 so that each node 2 applies an appropriate address to each information packet.

The present invention allows very high data transfer rates to be achieved. For example, as mentioned, a total node data transfer rate of 40 Mbps is entirely feasible. Data transmission rates of 5 Mbps with burst rates of 25 Mbps can be achieved with ease.

An embodiment of the present invention has been described with particular reference to the examples illustrated. However, it will be appreciated that variations and modifications may be made to the examples described within the scope of the present invention.

The invention claimed is:

1. A communications system, the system comprising:
   a plurality of nodes, each node having:
      receiving means for receiving via an antenna a signal transmitted by wireless transmitting means;
      transmitting means for wireless transmission of a signal via an antenna; and,
      means for determining if a signal received by said node includes information for another node and causing a signal including said information to be transmitted by said transmitting means to another node if said received signal includes information for another node;
      each node having one or more substantially unidirectional point-to-point wireless transmission links, at least some of the nodes having plural substantially unidirectional point-to-point wireless transmission links which share at least one of a receiver of the receiving means and a transmitter of the transmitting means, each of said links being to one other node only, at least some of the nodes being the origination and termination point of user traffic.

2. A system according to claim 1, wherein the nodes are linked so as to form transmission path loops thereby to provide plural choices of path for the transmission of a signal between at least some of the nodes.

3. A system according to claim 2, wherein each loop consists of an even number of links.

4. A system according to any of claim 1, wherein for each node that has plural links to other nodes, each of said plural links to another node is associated with a time slot.

5. A system according to claim 4, wherein each link for each node is associated with a distinct time slot.

6. A system according to claim 4 or claim 5, wherein the allocation of time slots to the links can be varied such that a link may selectively be associated with more than one time slot.

7. A system according to claim 1, wherein each node has a direct line-of-sight link with at least one other node such that each node can transmit a signal to another node in line-of-sight with said each node.

8. A system according to claim 1, wherein each node comprises means for transmitting a signal including said information to another node if and only if a signal received at said node includes information for another node.

9. A system according to claim 1, wherein each node is stationary.

10. A system according to claim 1, wherein the number of nodes is less than the number of links.

11. A system according to claim 1, wherein each node is arranged to be in a transmission mode for a time period which alternates with a time period for a reception mode.

12. A system according to claim 1, wherein at least one node is arranged not to transmit to any other node information in a signal received by said at least one node when that information is addressed to said at least one node.

13. A system according to claim 12, wherein each node is arranged not to transmit to any other node information in a signal received by said at least one node when that information is addressed to said at least one node.

14. A system according to claim 1, wherein each node has addressing means for adding to information in a received signal the address of a node to which a signal including said information is to be routed when said information is for another node.

15. A system according to claim 14, wherein the addressing means includes means for determining the route of information through the system and adding an appropriate address to the information accordingly.

16. A system according to claim 1, further comprising a central system controller for determining the route of information through the system.

17. A system according to claim 1, wherein at least one node has means for determining if a received signal includes information for said at least one node and processing means for processing information in a signal addressed to said at least one node.

18. A system according to claim 1, wherein the transmitting means of the nodes are arranged to transmit signals at frequencies greater than about 1 GHz.

19. A system according to claim 1, wherein the link between two nodes is arranged to use simultaneously two or more frequency channels.

20. A system according to claim 1, wherein said receiving and transmitting means are arranged to transmit and detect circularly polarised radiation.

21. A system according to claim 1, wherein the transmitting means includes a highly directional transmitter antenna.

22. A system according to claim 1, wherein the receiving means includes a highly directional receiver antenna.

23. A system according to claim 1, wherein each node is substantially identical.

24. A system according to claim 1, wherein the system is connected to a conventional trunk network for providing access to other networks.

25. A system according to claim 24, comprising a further node connected by a data connection to one of the nodes of the system and arranged to transfer a signal to or receive a signal from the trunk network or both.

26. A system according to claim 25, wherein a data storage server is connected to or provided at a node.

27. A system according to claim 1, wherein at least one link of a node is arranged to use a first transmission frequency and at least one other link of said node is arranged to use a second transmission frequency.

28. A system according to claim 1, wherein some of the nodes are allocated to subscribers and some of the nodes are not allocated to subscribers, at least some of said non-allocated nodes being solely for carrying information traffic between subscriber nodes.

29. A method of communications across a network of nodes, each node having one or more substantially unidirectional point-to-point wireless transmission links, at least some of the nodes having plural substantially unidirectional point-to-point wireless transmission links which share at least one of a receiver and a transmitter, each of said links being to one other node only, the method comprising the steps of:
  (A) originating user data at one of the nodes;
  (B) transmitting a signal including said user data from said node to another node along a substantially unidirectional point-to-point wireless transmission link between said nodes;
  (C) receiving said signal at said other node;
  (D) determining in said other node if the signal received by said other node includes user data for a further node and transmitting a signal including said user data from said other node to a further node along a substantially unidirectional point-to-point wireless transmission link between said nodes if said received signal includes user data for a further node; and,
  (E) repeating steps (B) to (D) until said user data reaches its destination node.

30. A method according to claim 29, wherein, for each node that has plural links to other nodes, each of said plural links to another node is associated with a time slot, and each transmission step on a link of said one node occurs during a distinct time slot and each receiving step on a link of said other node occurs during a distinct time slot.

31. A method according to claim 30, comprising the step of varying the allocation of time slots to the links such that a link is selectively associated with more than one time slot.

32. A method according to claim 29, wherein each node adds to user data in a received signal the address of a node to which a signal including said user data is to be routed when said user data is for another node.

33. A method according to claim 29, wherein each node has addressing means, the addressing means determining the route of the user data through the system and adding an appropriate address to the user data accordingly.

34. A method according to claim 29, wherein a central system controller determines the route of user data through the system.

35. A method according to claim 29, comprising the step of each node transmitting a signal including said user data to another node if and only if a signal received at said node includes user data for another node.

36. A method according to claim 29, including the steps of determining in at least one node if a received signal includes user data for said at least one node and processing the user data in a signal addressed to said at least one node.

37. A method according to claim 29, wherein the signals are transmitted at frequencies greater than about 1 GHz.

38. A method according to claim 29, wherein there are at least two possible paths for transfer of data between a source node and a destination node, and comprising the step of transmitting a copy of said data on each of said at least two paths.

39. A method according to claim 29, wherein there are at least two possible paths for transfer of data between a source node and a destination node, and comprising the steps of transmitting from the source node a part only of said data on each of said at least two paths and reconstructing the data from said transmitted parts of said data in the destination node.

40. A telecommunications switching device, comprising a communications system according to claim 1.

* * * * *